(12) United States Patent
Asher et al.

(10) Patent No.: US 7,660,985 B2
(45) Date of Patent: Feb. 9, 2010

(54) PROGRAM SECURITY THROUGH STACK SEGREGATION

(75) Inventors: Michael L. Asher, Green Grove Springs, FL (US); Charles C. Giddens, Conyers, GA (US); Harold Jeffrey Stewart, Alpharetta, GA (US)

(73) Assignee: AT&T Corp., New York, NY (US)

( * ) Notice: Subject to any disclaimer, the term of this patent is extended or adjusted under 35 U.S.C. 154(b) by 498 days.

(21) Appl. No.: 10/835,496

(22) Filed: Apr. 29, 2004

(65) Prior Publication Data

US 2004/0255146 A1      Dec. 16, 2004

Related U.S. Application Data

(60) Provisional application No. 60/466,475, filed on Apr. 30, 2003.

(51) Int. Cl.
G06F 12/16 (2006.01)
(52) U.S. Cl. .......................... 713/164; 726/22
(58) Field of Classification Search ................ 713/164, 713/167
See application file for complete search history.

(56) References Cited

U.S. PATENT DOCUMENTS

| | | | |
|---|---|---|---|
| 4,524,416 A | 6/1985 | Stanley | |
| 4,674,032 A * | 6/1987 | Michaelson | ................ 711/169 |
| 5,107,457 A | 4/1992 | Hayes et al. | |
| 5,913,024 A | 6/1999 | Green | |
| 5,915,087 A | 6/1999 | Hammond | |
| 5,918,018 A | 6/1999 | Gooderum | |
| 5,950,195 A | 9/1999 | Stockwell et al. | |
| 5,983,350 A | 11/1999 | Minear | |
| 6,003,084 A | 12/1999 | Green | |
| 6,058,457 A | 5/2000 | Tremblay | |
| 6,108,787 A | 8/2000 | Anderson et al. | |
| 6,145,001 A | 11/2000 | Scholl et al. | |
| 6,160,808 A | 12/2000 | Maurya | |
| 6,167,504 A | 12/2000 | Damron | |
| 6,198,920 B1 | 3/2001 | Doviak et al. | |
| 6,219,707 B1 | 4/2001 | Gooderum et al. | |
| 6,321,336 B1 | 11/2001 | Applegate | |
| 6,332,195 B1 | 12/2001 | Green et al. | |
| 6,381,646 B2 | 4/2002 | Zhang et al. | |
| 6,418,324 B1 | 7/2002 | Doviak et al. | |
| 6,442,661 B1 | 8/2002 | Dreszer | |

(Continued)

OTHER PUBLICATIONS

M. Seidl, et al., "Segregating Heap Objects by Reference Behavior and Lifetime", Department of Computer Science, University of Colorado, pp. 12-23.

(Continued)

*Primary Examiner*—Matthew B Smithers
(74) *Attorney, Agent, or Firm*—Fay Kaplun & Marcin, LLP

(57) ABSTRACT

For each process a stack data structure that includes two stacks, which are joined at their bases, is created. The two stacks include a normal stack, which grows downward, and an inverse stack, which grows upward. Items on the stack data structure are segregated into protected and unprotected classes. Protected items include frame pointers and return addresses, which are stored on the normal stack. Unprotected items are function parameters and local variables. The unprotected items are stored on the inverse stack.

20 Claims, 5 Drawing Sheets

U.S. PATENT DOCUMENTS

| | | | |
|---|---|---|---|
| 6,490,289 | B1 | 12/2002 | Zhang et al. |
| 6,557,093 | B2 | 4/2003 | Vlot et al. |
| 6,578,094 | B1 * | 6/2003 | Moudgill ............... 710/57 |
| 6,618,764 | B1 | 9/2003 | Shteyn |
| 2001/0013094 | A1 * | 8/2001 | Etoh et al. ............ 712/227 |
| 2002/0122394 | A1 | 9/2002 | Whitmore et al. |
| 2002/0144141 | A1 * | 10/2002 | Edwards et al. ......... 713/200 |
| 2003/0017845 | A1 | 1/2003 | Doviak et al. |
| 2004/0103252 | A1 * | 5/2004 | Lee et al. .............. 711/132 |

OTHER PUBLICATIONS

C. Zou, et al., "Monitoring and Early Warning for Internet Worms", University of Massachusetts at Amherst, ACM, CCS Oct. 2003, pp. 190-199.

L. Masinter, et al., "Local Optimization in a Compiler for Stack-based Lisp Machines", Xerox Palo Alto Research Center, pp. 223-230.

M. Leberecht, "The MuSE System: A Flexible Combination of On-Stack Execution and Work-Stealing", Institut fur Informatik, Germany, pp. 1-14.

J. Neliben, "Buffer Overflows for Dummies", GSEC Practical Assignment Version 1.4, SANS Institute, May 1, 2002, pp. 1-27.

M. Donaldson, "Inside the Buffer Overflow Attack: Mechanism, Method, & Prevention", GSEC Version 1.3, SANS Institute, Apr. 3, 2002, pp. 1-24.

D. Barrett, "Using Lifetime Predictors to Improve Memory Allocationj Performance", Department of Computer Science, University of Colorado, ACM 1993, pp. 187-196.

www.securecomputing.com/pdf/type_enforcement_wp.pdf, "Sidewinder G2 Firewall Type Enforcement Technology—Whitepaper", Feb. 11, 2003.

N. Weaver, "A Taxonomy of Computer Worms", WORM '03, ACM, Oct. 27, 2003, pp. 11-18.

* cited by examiner

PROGRAM SECURITY THROUGH STACK SEGREGATION

RELATED APPLICATIONS

This application is related to, and claims priority based on, U.S. Provisional Patent Application No. 60/466,475 filed Apr. 30, 2003, which Provisional Patent Application is hereby incorporated in its entirety in the present non-provisional application.

BACKGROUND

This invention relates to computer security. More particularly, the present application relates to apparatus and methods for reducing or eliminating the adverse effects of malicious computer program code introduced by intrusions into computer systems and otherwise. Still more particularly, the present invention relates to reducing or eliminating the effects of computer viruses, worms and other malicious intrusions through the use of program stack protection techniques.

Many violations of computer security depend upon exploiting a mistake or oversight by the programmer(s) of an application or firmware on the target computer. Such nefarious activities as the introduction of viruses or worms into unsuspecting computers, or theft of computer-based data or services have become more frequent and costly in recent years.

Common practice in designing and manufacturing computer CPUs, including CPU chips, is to include within the system a set of memory locations or registers to be used as an area for temporarily storing information. Such memory or registers are referred to as a stack into which operands are pushed down (stored) and popped off (unloaded) on a last-in, first-out (LIFO) basis. The stack is conveniently divided into stack frames, usually related to individual program portions or constructs known as procedures, functions, threads, or the like. A modular program, e.g., one having a plurality of procedures, will have multiple stack frames within a particular stack when a given procedure calls another procedure, e.g., returning jump, or calls itself, e.g., a reentrant procedure call.

One of the most common hacker attacks (used, e.g., by the 2002 'Code Red' and 2003 'SQL Slammer' worms) is the "buffer overrun attack". A buffer overrun attack is a technique in which the attacker supplies an overly large text string or array to a vulnerable system that fails to check and control the size of the input. The attacking string is then copied into a buffer, including a stack buffer that is too small to hold it. The excess string data then spills over from the buffer, thus overwriting other portions of memory, including those portions containing variables or flow control pointers on the process stack.

Under many operating conditions, a computer buffer overrun will cause the running process to crash or simply malfunction in a random fashion. In the case of a malicious buffer overrun attack, however, the attacker often carefully constructs the input data so that the overflow portion is not random. Instead, specific values are chosen to force the process to perform actions of the attacker's choosing. Numerous studies have been undertaken to understand and defend against buffer overrun and related attacks. See, for example, Zou, CC, et al., "Monitoring and Early Warning for Internet Worms," *Proceedings of the* 10*th ACM conference on Computer and communication security*, October, 2003; and Weaver, N, et al., "A Taxonomy of Computer Worms," *WORM'* 03, Oct. 27, 2003. Also of interest in understanding buffer overflows is the paper by Neiliβen, J entitled "Buffer Overflows for Dummies," SANS Institute, 2002, available at http://www.sans.org/rr/papers/60/481.pdf, which paper is hereby incorporated by reference in the present disclosure. This problem is further treated in Donaldson, M. J., "Inside the Buffer Overflow Attack: Mechanism, Method and Prevention, Feb. 6, 2003, available at http://www.sans.org/rr/papers/46/386.pdf.

Various techniques for protecting against such buffer-overrun attacks have been proposed (e.g., stack guarding, runtime length checking, and the like), but all either impose a severe performance penalty on a system, are vulnerable to attack themselves, or both. Some require the original source code of a software system to be partially rewritten or translated into another language, a prohibitively costly effort.

In some aspects, operations involving execution stacks and associated heaps have proven problematic in other contexts. Therefore, a number of computer architecture approaches have included adaptations of instruction stack and heap organizations, to achieve specific memory management goals. An early technique for creating stacks of appropriate length for a given procedure or the like is described in U.S. Pat. No. 4,524,416, which patent is hereby incorporated by reference as if set forth in its entirety herein.

U.S. Pat. No. 6,442,661 describes another stack architecture that seeks to achieve tuning of memory management operations by assigning memory blocks of varying size in varying parts of a memory. U.S. Pat. No. 6,058,457 discloses a system in which plural stacks are employed for storing component parts, e.g., operands and local variables (or arguments), of stack frames in different stack structures. A goal of this latter approach is to facilitate access to the several parts of a stack frame. U.S. Pat. No. 6,557,093 discloses a stack-oriented computer structure with two stacks, each storing words of different length. In the last-noted patent, a stack of shorter word-length elements is typically used for numerical operands, while a stack having longer word length is used for addresses for operands.

An unresolved problem remains, however: how can stack architecture be adapted to help in countering attacks by viruses, worms or other malicious invaders that exploit known stack operation to cause overflow of buffers, thereby to alter operating computer code in the areas into which overflow occurs.

SUMMARY OF THE INVENTION

Limitations of the prior art are overcome and an advance in the art is realized by employing an input-string-management method and system, which, in illustrative embodiments, receives input strings relating to computer processes and pushes and pops component items (execution items) of such strings on and off a newly configured stack structure, in interacting with instruction execution elements, the new combination is operative to increase security against many common forms of buffer overrun attacks.

In illustrative operation, each process employs a plural-stack data structure that illustratively includes two component stacks joined at their bases. These two stacks include a normal stack, which grows downward, and an upward-growing inverse stack. Items on the stack data structure are advantageously segregated into protected and unprotected classes. Protected items include frame pointers and return addresses; these are illustratively stored on the normal stack. Unprotected items include function parameters and local variables, which unprotected items prove suitable for storage on the inverse stack.

An underlying mechanism of an illustrative embodiment of the present invention thus employs a mode of stack framing that separates a stack into two copies, and provides protection for most stack data. While not always totally effective, embodiments of the present invention provide a high level of security with relatively little memory or performance overhead.

Embodiments of features of the present invention may be incorporated in compiler or other translator software to generate executable binary code and other execution items (variables, parameters, etc.) suitable for directing an execution unit of a processor to create appropriately configured instances of the novel stack structure and to control population of, and access to, such stack structures. Other embodiments of the present invention will include instruction execution methods and hardware for creating instances of the innovative stack data structures and controlling access to these stack structures. Applications of instruction execution functionality using the present inventive teachings will include network protection through monitoring of incoming strings (in packets arriving at a network firewall, for example), as well as more general purpose instruction processing.

DETAILED DESCRIPTION

Figure 1A:
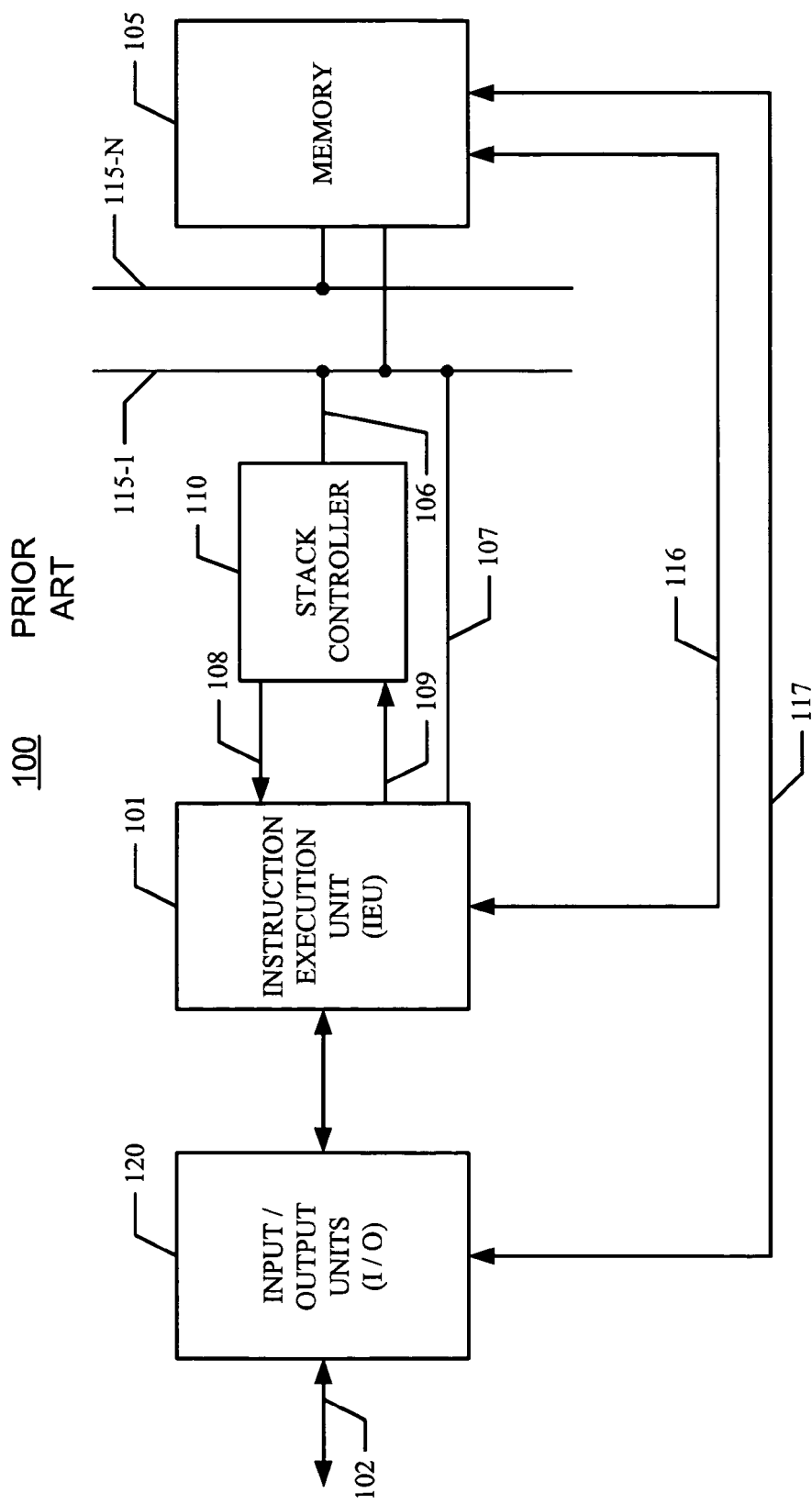
FIG. 1A shows a prior art computer execution arrangement including stack control.

FIG. 1A shows an illustrative prior art computer processor arrangement for processing input strings. In typical operation, the system of FIG. 1A receives input strings at Input/Output (I/O) unit 120 via input path 102 for delivery to Instruction Execution Unit (IEU) 101. IEU 101 operates under the control of instructions present memory, including a stack, as discussed in detail below. Memory will in some cases, include hardware registers appropriate to a particular configuration. Stack controller 110 in typical operation responds to control signals received over illustrative input path 109 from IEU 101 to reserve selected areas in memory 105 for stack and other particular uses. In appropriate cases, inputs from path 102 may pass directly between I/O 120 and memory 105. Stack controller 110 also typically provides inputs to IEU 101 via illustrative path 108 to supply information useful in identifying and transferring operators, operands, parameters and other data between IEU 101 and memory 105. One illustrative system employing a stack mechanism and associated memory allocation is disclosed in U.S. Pat. No. 4,524,416, issued Jun. 18, 1985.

Figure 2:
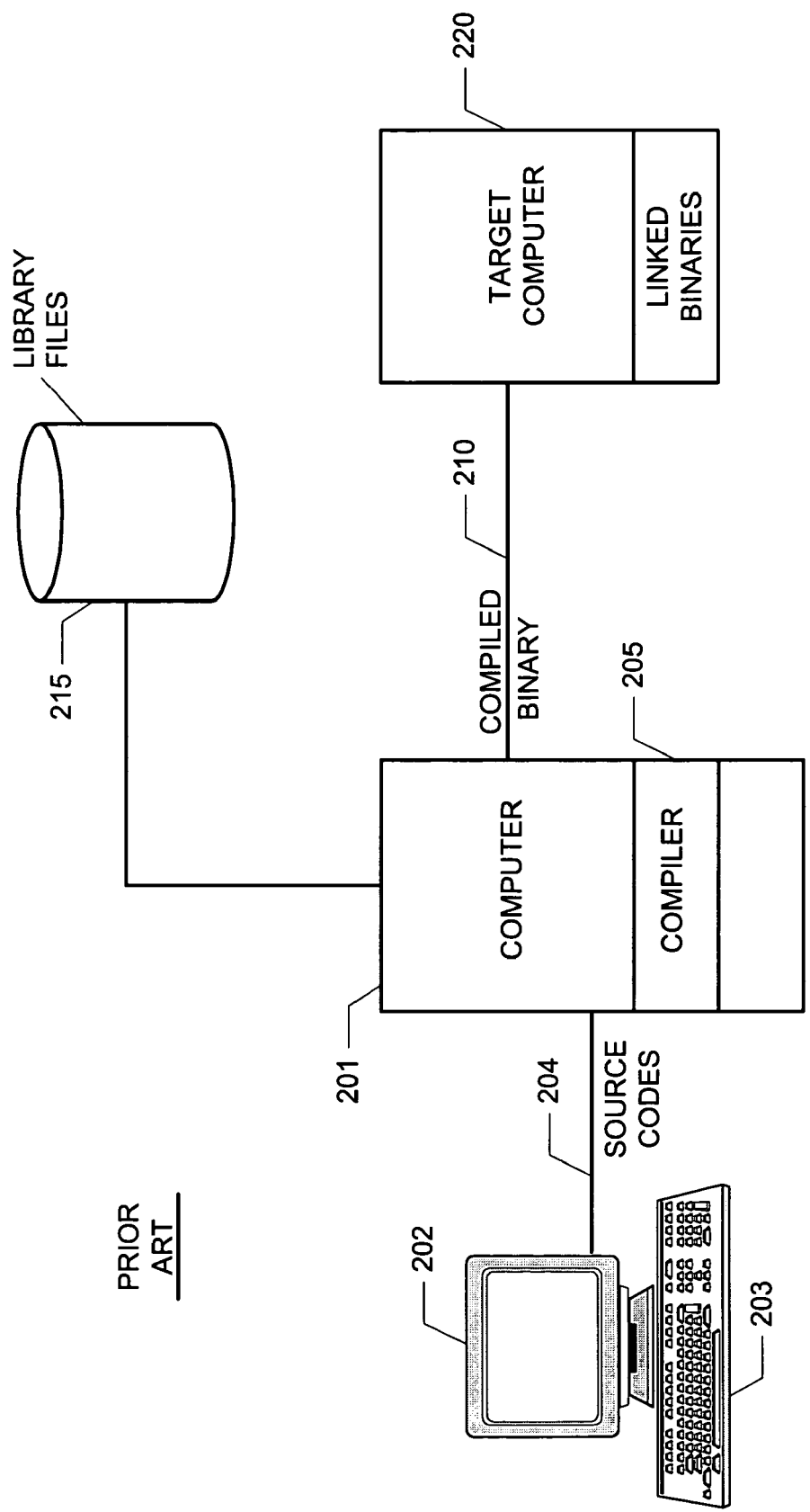
FIG. 2 presents generally a well-known (prior art) computer organization for processing programmer-generated source code, to generate executable binary codes at a target computer.

FIG. 2 shows a typical arrangement by which code is produced for use in a computer. Thus, a programmer inputs or assembles source language program statements or modules, illustratively in the well-known C or C++ programming languages, at a terminal shown as 202 for delivery to computer 201 over input 204. Computer 201 is shown having a compiler (itself a computer program) adapted to receive source language inputs and produce compiled binary program sequences, e.g., on output 210, that are compatible with target computer 220. In the course of compilation at computer 201 it is common to link functions, program segments and other components from existing libraries represented as 215 in FIG. 2. The result of these operations is to produce in target computer 220 a set of linked binary codes (executable programs) suitable for use on target computer 220.

Among the executable codes are processes and directions to computer 220 for producing stacks, heaps and other program items, and for allocating portions of memory for these and other data structures. Above-cited U.S. Pat. No. 4,524,416 includes illustrative instructions and hardware for creating and populating such data structures in a memory—generally consistent with the arrangement of FIG. 1A.

Compilers for performing translation to executable codes are well known and available for a wide range of target computers and more specialized processors. That is, well-known compiler techniques are available for generating instructions suitable for directing and controlling target machine hardware and software to create data structures and memory allocations for any well-defined stack and heap organization. Moreover, compiler techniques for implementing such data structures and memory allocations for all processes consistent with the implementation source language and target machine are similarly well known to those skilled in the art. One classic example is the compiler described in Masinter, L. M. and L. P. Deutsch, "Local optimization in a compiler for stack-based Lisp machines," *Proceedings of the 1980 ACM conference on LISP and functional programming*, 1980, pp. 223-230.

An executing computer program ("a process") on most modem CPUs follows a well-defined convention for memory usage. Among the techniques long used for memory allocation in current operational systems is the standard C language function malloc. Many other particular memory allocation techniques have been developed to optimize use of memory for particular classes of uses and programming environments. See, for example, Barrett, D. A. and B. G. Zorn, "Using Lifetime Predictors to Improve Memory Allocation Performance," *Proc. ACM SIGPLAN PLDI*, June, 1993 and the many references cited in that paper.

Figure 1B:
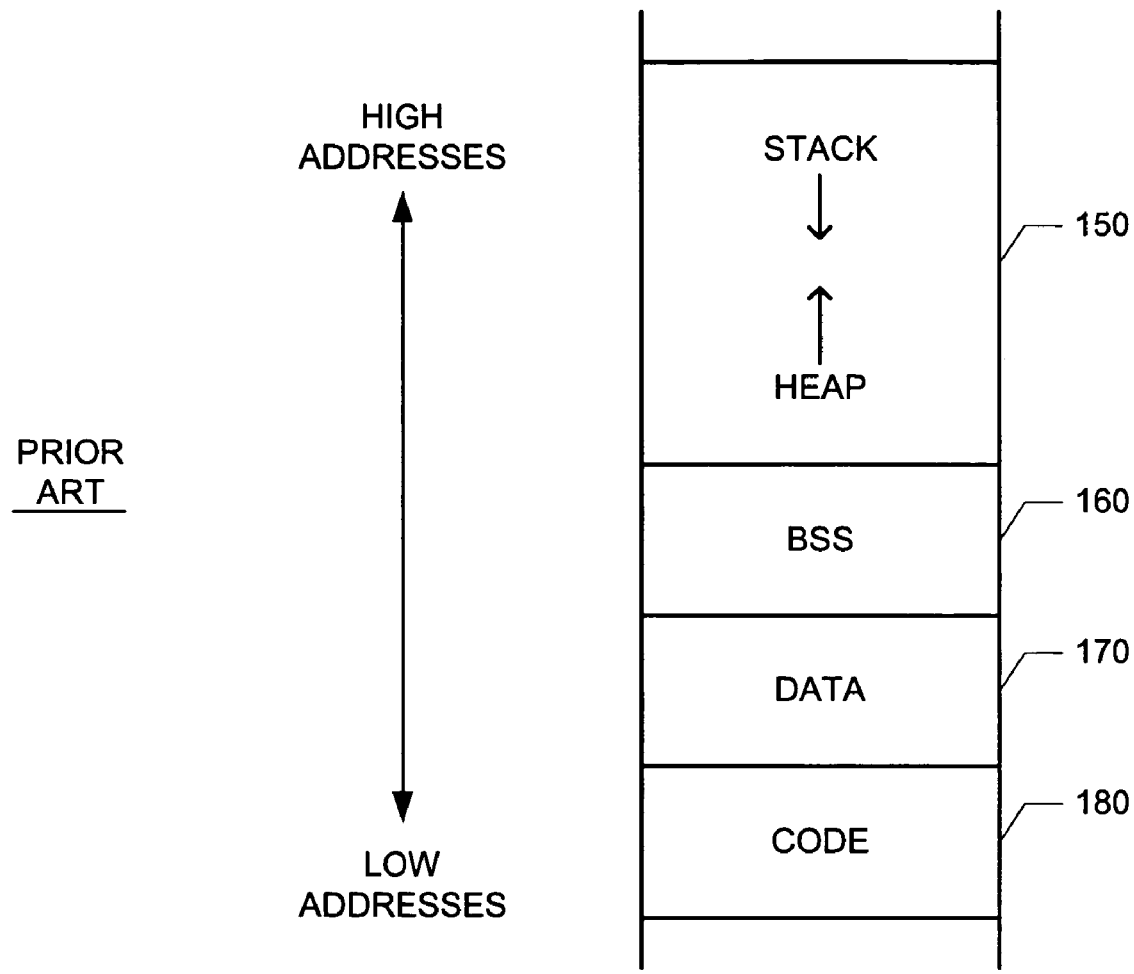
FIG. 1B shows an illustrative prior art arrangement of memory in a computer executing input strings.

In one illustrative organization of memory content shown in FIG. 1B, static code and data are first loaded to respective memory segments 180 and 170. Then, remaining free memory is illustratively divided among (i) a Block Started by Symbol (BSS) content segment 160, (ii) a program stack (or, simply, stack) and (iii) a heap, segments (ii) and (iii) sometimes being referred to collectively as data stored in segment 150. This data segment 150 differs from BSS segment 160 in that the latter typically contains uninitialized global variables, while data segment 150 contains variables that have been assigned an initial value in the program code.

Typically, the stack is at the top of a memory space and grows downward as new items are added to it, whereas the heap is at lower memory locations and grows upward. The stack for a particular process holds several different items at any time, e.g., return addresses, local variables and parameters, and stack frame pointers. Stack frames are the memory boundaries on the stack within which the several items (addresses, variables, etc.) associated with a particular process are located.

For any single procedure (or function) call, stack operations follow a set order. Consider the following code fragment:

```
foo ( )
(
foo2(a,b);
)
foo2(a,b)
(
return;
)
```

For Function foo to call foo2, illustrative stack operations are performed as follows. First, foo pushes all parameters onto the stack, e.g., first value b, then value a. The function foo executes a call to foo2, pushing its own return value onto the stack. The function foo2 saves foo's stack frame by pushing that stack frame onto the stack. The function foo2 makes its own stack frame by copying the stack pointer to it. The function foo2 reserves space on the stack for its own local variables.

After foo2 executes, stack operations are performed as follows. The function foo2 pops foo's stack frame off the stack. The function foo2 returns to foo by jumping to the return value found on the stack. Lastly, foo removes parameters from the stack, or foo2 may do this in some implementations.

An example of the process in IA-32 (×86) opcodes is as follows:

```
MOV     eax, [n]      ; load value of variable n
PUSH    eax           ; store n on stack
CALL    (foo2)        ; call foo2 with parameter n
ADD     esp, 4        ; remove n from stack
PUSH    ebp           ; save caller's stack frame
MOV     ebp, esp      ; set new stack frame for this routine
SUB     esp, (###)    ; make room for ### bytes local variables
                      ;
...     ...           ; perform whatever foo2( ) does
                      ;
MOV     esp, ebp      ; restore stack pointer
POP     ebp           ; restore caller's stack frame
RET                   ; return
```

During the lifetime of foo2, stack memory holds foo2's local variables directly adjacent to the stack frame and return address for foo. Such an arrangement makes stack-based buffer overrun attacks possible.

Should foo2 use any string or array variables (or union/structure variables in some cases), it then becomes vulnerable to an overrun attack. For example, foo2 may define a local character array to hold a password of up to 20 characters. If a 28-character password is received as input and the programmer does not check explicitly for this length overflow, the last 8 characters will overwrite the previous 8 bytes on the stack. (It is important to note that it is the previous, not next, 8 bytes since the stack grows downward, while most string/array copy operations proceed upward.) If this array is the first one defined by foo, then the return address and stack frame for foo will be replaced with the last 8 bytes of whatever string was sent as a password.

Normally, as noted earlier, this scenario would cause a memory fault or other program malfunction. If, however, an attacker selects specific values for these 8 bytes, a program can be made to execute code at an arbitrary location, e.g., a system call to format a disk, grant administration rights, or, more insidiously, a jump to the stack itself, to execute as code the remaining portion of the string that caused the overflow.

Even if the array variables are not immediately adjacent to the return address, an attacker can still exploit the stack structure by using a larger overflow string padded with NOP (no operation) codes to reach the target area. This approach is sometimes preferred by an attacker, as it gives the attacker more space in which to insert malevolent code.

It would appear that a simple solution would be to simply check the length of all data input by a user. User input can follow unexpected paths, however, and in today's complex software, may not even originate (or appear to originate) from a user, but from another process. Also, an input may pass a length test at one point, but due to dynamic conditions or being concatenated with other value(s), not pass at another. Finally, programmers can (and do) either fail to test string lengths altogether or simply test with incorrect values.

Other reasons length tests are not always performed include the often large performance penalty imposed by run-time libraries that automatically check for overflow conditions on move/copy operations. Stack guarding techniques that insert fixed or variable values between the stack space of a parent and child routine generally impose a lesser performance cost, but are themselves exploitable in a number of ways. Such stack guarding techniques therefore provide extremely limited security.

Figure 3A:
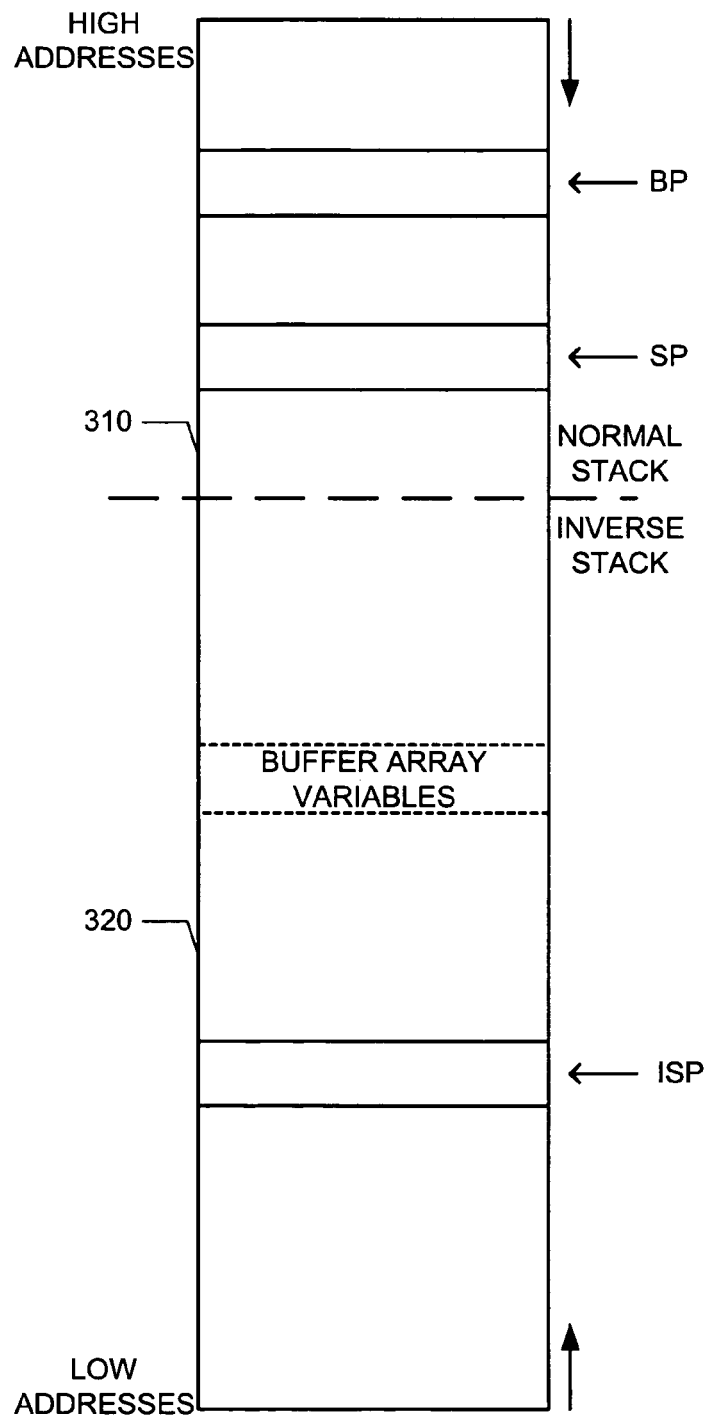
FIG. 3A shows a stack data structure arrangement in accordance with an aspect of the present invention.

In accordance with one aspect of illustrative embodiments of the present invention, and as an improved alternative to the stack arrangements described above, a plurality of stacks is created in memory for every process, instead of the usual single stack. Moreover, it proves highly advantageous to join the plural stacks at their bases. For the illustrative case of two stacks, this new stack organization includes a normal stack that grows downward, and an inverse stack that grows upward. FIG. 3A illustrates a typical structuring of such a two-part stack, including normal stack 310 and inverse stack 320.

Further, in accordance with another aspect of illustrative embodiments of the present invention, items on the illustrative two-part stack are segregated into protected and unprotected classes. Protected items include frame pointers and return addresses, and are advantageously stored on the normal stack 310 in FIG. 3A. Unprotected items include function parameters and local variables, and are advantageously stored on the inverse stack 320 in FIG. 3B.

Such stack segregation provides several benefits. As the inverse stack grows upward, the vast majority of overrun conditions will flow into unused (normal) stack space. In rare cases, an attacker can find and exploit a string or array input that overflows a buffer in reverse. Even in these cases, the values in proximity to the buffer are local variables and parameters for other processes, and not a return address that allows execution of arbitrary code.

To reach these return addresses an attacker must input enough data to overflow every parameter and local variable still on the stack since the process began executing. This is difficult for several reasons. An attack of this size is larger, and thus more visible. An overrun this large will typically be several thousand bytes or more, which may trigger length checks in other places (the maximum size of a network packet, for instance). Also, while the local composition of the stack for a single function call is usually static, the global composition can vary, which means an attack may work on a test machine, but fail on the target due to a different call order or differing number or value of parameters on the stack at that time. Finally, for an attacker to implement this sort of attack requires a much deeper level of knowledge of a target process than that required for a localized stack space attack.

Figure 4:
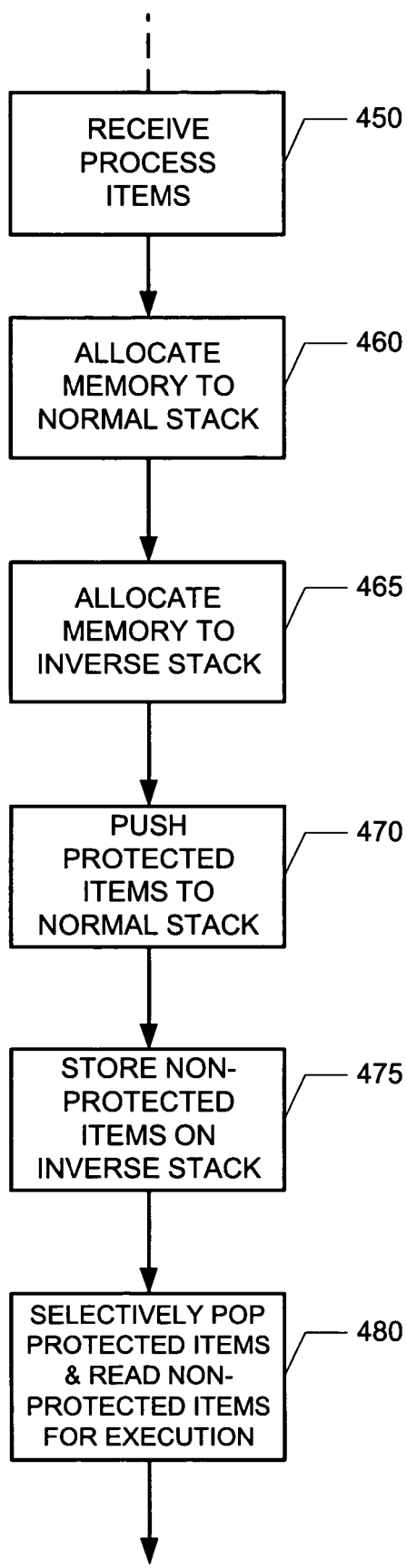
FIG. 4 is a flowchart illustrating a method for use with the new stack data structure of FIGS. 3A and 3B.

An illustrative instantiation of a normal and an inverse stack will now be described with reference to the flowchart of FIG. 4 for an illustrative process. FIG. 4 shows at step 450 the receiving at a processor of a set of process items corresponding to a current process. This set of items corresponds to the compiled binary codes supplied on input 210 to target computer 220 in FIG. 2. In an illustrative example, these codes will be supplied through an input/output unit such as 120 in FIG. 1A and the execution of these codes will be accomplished by instruction execution unit 101 in FIG. 1A while interacting with stack controller 110 and memory 105. Other aspects of the computer or other processor not essential to an understanding of the present invention have been omitted from FIGS. 1A and 2.

Returning to the discussion of FIG. 4, available stack memory is allocated between the normal and inverse stacks, as shown at steps 460 and 465. This may be an arbitrary allocation of stack memory between the two stacks, or some more systematic method of allocation may be used. It will prove advantageous in many cases to allocate a greater portion of memory to the inverse stack—as when the number of non-protected items, or any large-size indication for non-protected items, is available. Further, received string or array variables (an indicated source of potential overrun) are advantageously included among the unprotected items and are stored in the inverse stack 320 in FIG. 3B. For present illustrative purposes, then, it will be assumed that one-third of stack memory will be used for the normal stack, and the remaining two-thirds for the inverse stack—as shown in FIG. 3A.

Figure 3B:
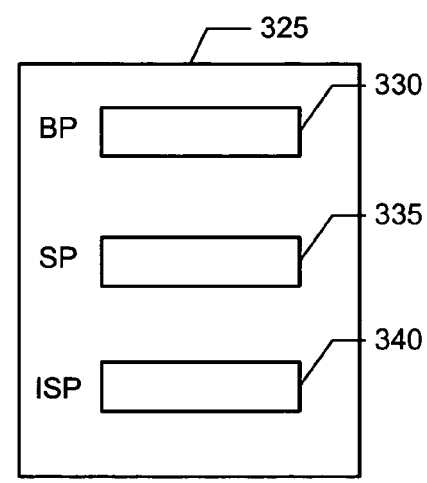
FIG. 3B shows registers (memory or hardware) for storing pointer information useful in accessing the stack structures of FIG. 3A.

The process then sets an initial stack pointer (SP) to two-thirds the maximum value, and a matching initial base pointer (BP) or stack frame is then set, advantageously in registers shown in FIG. 3B as 335 and 330, respectively. A new value (termed the inverse stack pointer, or ISP) is also be maintained, advantageously in register 340 in FIG. 3B. However, in some cases the current ISP value will be stored in memory, e.g., if the compiler supplying process items for the process does not expressly provide for register storage.

Stack framing for local variables and parameters (unprotected items stored in inverse stack 320) is always done in reference to the ISP, and the ISP must be manually adjusted after each pseudo push/pop operation performed on the inverse stack, as will be illustrated below. Use of the term pseudo push/pop indicates that there is no actual push or pop in the normal sense, but that framing of items on the inverse stack is accomplished by employing values relative to the ISP value.

For any single function, local variables are oriented on the stack so that buffer string/array type variables are highest in memory, as illustrated in FIG. 3A. This location for string/array variables gives at least limited protection to other local variables, as these other local variables cannot be reached without the occurrence of a reverse overflow condition.

An LA-32 example of function prologue/epilog (relating to a CALL to the generic function foo2) using the stack segregation approach is as follows:

```
MOV     eax, [n]        ; load value of variable n
MOV     [isp], eax      ; store n on inverse stack
CALL    (foo2)          ; call subroutine foo2 with parameter n
ADD     isp, 4          ; restore inverse stack pointer
PUSH    ebp             ; save calling routine's stack frame
MOV     ebp, isp        ; new stack frame = inverse stack pointer
ADD     isp, (4+###)    ; make room for ### bytes local variables
```

-continued

```
...     ...             ; perform whatever foo2( ) does
MOV     isp, ebp        ; restore inverse stack pointer
POP     ebp             ; restore caller's stack frame
```

Instead of function parameters being pushed onto the stack, they are written (MOVed) into ISP-indexed memory. The ISP is used to load initial (inverse) stack frames.

Note that the stack pointer for the normal stack (esp) is never explicitly referenced or modified. Rather, it is updated solely as a result of push, pop, call, and return operations. As noted, the ISP must be manually adjusted after each pseudo push/pop operation. As an optimization in the example above, the manual update for function parameters is combined with the reservation of local variable space.

Advantageously a compiler, such as 205 in FIG. 2 is adapted to reserve an actual CPU register to represent the ISP. Under such circumstances, program execution performance is essentially identical in the two-stack organization of FIG. 3A. Since local variables are stored with an indexed MOV instead of a PUSH, execution may be marginally slower on some CPUs. In those cases where a compiler does not reserve a register for the ISP, two additional memory accesses per function invocation will be required. Overall, the present inventive two-stack approach experiences minimal or no adverse impact on execution speed compared with normal single-stack operation. By way of contrast, the performance penalty when length-testing libraries are used to enhance resistance to buffer overflows may approach or even exceed 40%. Little or no additional memory overhead is incurred using the present inventive stack segregation approach.

Other advantages accrue when using optimized compilers adapted for use with the present inventive stack segregation approach. In particular, compilers optimized to the particular inventive data structures and methods for populating and accessing execution items in the respective portions of these inventive data structures provide enhanced performance, while also achieving enhanced overflow protection realized by embodiments of the present invention.

An alternative illustrative embodiment provides even higher security protection from buffer overruns by using the inverse stack only for holding local string or array variables. Function parameters and non array-based local variables (both styled non-protected in the previous discussion) then remain on the normal stack. This alternative implementation allows function parameters and non-array-based local variables additional overrun protection, but may prove somewhat slower in some contexts because the base pointer may be manipulated within the body of a function.

While particular plural-stack data structures and access methods have been described in connection with illustrative embodiments of the present invention, it will be understood by those skilled in the art that other particular plural-stack data structures based on present inventive principles, and within the scope of the attached claims, may find application in particular cases. Thus, for example, an inverse stack may be otherwise segregated and displaced in memory from a related normal stack in such manner as to reduce the possibility of an overflow of contents from the inverse stack into the normal stack. A further or different segregation of process items will prove advantageous in some applications or contexts. Thus, variables and parameters other than those described above may arise in connection with some processes that suggest a different segregation. As well, particular processes may have variables or parameters that have relatively little significance or risk associated with their corruption by potentially offending string/array variables; in the interest of memory conservation, these may accordingly be allocated memory locations that are more vulnerable to overrun.

While the foregoing inventive methods and structures have been described in terms of processes, it will be understood that these same structures and methods (and variations thereof) will occur to those skilled in the art for use in processing function calls, system calls, subroutines, threads, and other computer processing constructs.

What is claimed is:

1. A method for executing computer processes comprising:
   receiving execution items for each said computer process,
   creating a plurality of stack data structures,
   segregating said execution items into a plurality of classes of execution items,
   pushing execution items in at least a first set of said classes on respective ones of a set of first stack data structures, each of said first stack data structures being addressed by a stack pointer,
   storing execution items in at least a second set of said classes in respective ones of a set of second stack data structures, each of said second stack data structures being addressed by an inverse stack pointer, and
   applying said execution items to an instruction execution unit by:
   selectively popping said execution items in said at least a first set of said classes from said first set of stack data structures, and
   selectively reading said execution items in said at least a second set of said classes from said second stack data structures.

2. The method of claim 1 wherein said execution items comprise stack pointers, frame pointers, return addresses, global variables, local variables, string variables, array variables.

3. The method of claim 1 wherein said segregating said execution items into a plurality of classes of execution items comprises segregating said execution items into at least a protected class of execution items and a non-protected class of execution items.

4. The method of claim 1 wherein said set of first stack data structures comprises at least one normal stack data structure.

5. The method of claim 3 wherein said pushing of execution items in at least a first set of said classes in respective ones of a set of first stack data structures comprises pushing said protected class of execution items on respective ones of a set of first stack data structures.

6. The method of claim 5 wherein said set of first stack data structures comprises at least one normal stack data structure.

7. The method of claim 6 wherein said set of first stack data structures comprises exactly one normal stack data structure.

8. The method of claim 1 wherein said set of second stack data structures comprises at least one inverse stack data structure.

9. The method of claim 3 wherein said storing execution items in at least a second set of said classes in respective ones of a set of second stack data structures comprises storing said non-protected class of execution items on respective ones of a set of second stack data structures.

10. The method of claim 9 wherein said set of second stack data structures comprises at least one inverse stack data structure.

11. The method of claim 10 wherein said set of second stack data structures comprises exactly one inverse stack data structure.

12. The method of claim 5 wherein said selectively popping said execution items in said at least a first set of said classes from said first set of stack data structures comprises popping said protected class of execution items from respective ones of said set of first stack data structures.

13. The method of claim 12 wherein said set of first stack data structures comprises at least one normal stack data structure.

14. The method of claim 12 wherein said set of first stack data structures comprises exactly one normal stack data structure.

15. The method of claim 5 wherein said selectively reading said execution items in said at least a second set of said classes from said second stack data structures comprises reading said non-protected class of execution items from respective ones of said set of second stack data structures.

16. The method of claim 15 wherein said set of second stack data structures comprises at least one inverse stack data structure.

17. The method of claim 15 wherein said set of second stack data structures comprises exactly one inverse stack data structure.

18. The method of claim 1 wherein said execution items in said at least a second set of said classes comprises string variables.

19. The method of claim 1 wherein said execution items in said at least a second set of said classes comprises string variables.

20. The method of claim 1 wherein said execution items in said at least a first set of said classes comprises stack pointers, frame pointers and return addresses.

* * * * *